United States Patent [19]
Shiga et al.

[11] Patent Number: 5,490,426
[45] Date of Patent: Feb. 13, 1996

[54] METHOD FOR DETECTING STRESSES

[75] Inventors: Tohru Shiga, Okazaki; Akane Okada, Obu; Hideroh Takahashi, Aichi; Toshio Kurauchi, Nagoya, all of Japan

[73] Assignee: Kabushiki Kaisha Toyota Chuo Kenkyusho, Aichi, Japan

[21] Appl. No.: 405,960

[22] Filed: Mar. 17, 1995

[30] Foreign Application Priority Data

Mar. 18, 1994 [JP] Japan .................................. 6-049067
Feb. 14, 1995 [JP] Japan .................................. 7-025725

[51] Int. Cl.$^6$ ........................................... G01L 1/00
[52] U.S. Cl. ............................. 73/762; 73/862.624
[58] Field of Search ................ 73/862.624, 862.623, 73/862.621, 762

[56] References Cited

U.S. PATENT DOCUMENTS 4,768,886 9/1988 Hirschfeld et al. .................... 73/714
4,781,056 11/1988 Noel et al. .

FOREIGN PATENT DOCUMENTS 62-124416  6/1987  Japan .
3-220433   9/1991  Japan .
2194062    2/1988  United Kingdom ............... 73/762

OTHER PUBLICATIONS

Non–Destructive Inspection Technique Series "Strain Measurement B" 1980; Cover Page & pp. 220–225.

Primary Examiner—Hezron E. Williams
Assistant Examiner—Ronald L. Biegel
Attorney, Agent, or Firm—Oblon, Spivak, McClelland, Maier & Neustadt

[57] ABSTRACT

A method for detecting stresses includes the steps of dispersing a fluorescent substance in a solid portion where stresses are to be detected, measuring fluorescence decay time of the fluorescent substance dispersed in the solid portion, and detecting stresses in the solid portion based on the measured fluorescence decay time. The method enables to non-destructively detect stresses in resin-molded products without impairing their mechanical properties.

15 Claims, 3 Drawing Sheets

METHOD FOR DETECTING STRESSES

BACKGROUND OF THE INVENTION

1. Field of the Invention

The present invention relates to a non-destructive detection process which utilizes a time resolved fluorescence technique for detecting and measuring stresses and strains in solid portions of resin-molded products or coatings in a non-destructive manner, and it can be utilized effectively so as to improve the quality of resin-molded products or coatings.

2. Description of the Related Art

A large number of resin-molded products have been prepared with thermoplastic resins like polypropylene, polystyrene and nylon, and with thermosetting resins like epoxy resin and melamine resin. The resin-molded products have been used widely in kitchens as well as in vehicles such as automobiles and trains. In general, these resin-molded products are manufactured by injection molding, transfer molding or compression molding. It has been known that stresses and strains, associated with the heat developed during the forming processes, reside in the resin-molded products, and adversely affect them considerably in terms of reliability. For instance, the stresses and strains degrade the yield of the resin-molded products, and they cause defects like cracks or wrinkles in the resin-molded products after taking the finished products out of the molds. Moreover, it has been pointed out that, when the resin-molded products with stresses and strains resided therein are used for a long period of time, such resin-molded products are gradually degraded by external loads, chemicals or ultraviolet rays in terms of durability.

In addition, there occurs the case where, not only the durability of the resin-molded products, but also the durability of the coatings depends greatly on the stresses present in the coatings.

Accordingly, it is extremely important to measure stresses which act on or reside in solid portions of the resin-molded products and coatings.

There are spectroscopic methods for non-destructively measuring stresses and strains which act on solid portions or reside therein. Among the methods, a photoelasticity method, a Laser Raman spectroscopic method and an X-ray stress measurement method have been well known.

For instance, as set forth in Japanese Unexamined Patent Publication (KOKAI) No. 62-124,416, stresses and strains are measured by the photoelasticity method. The photoelasticity method is based on birefrigence which is observed when external forces are applied to material objects and stresses are produced therein. In this photoelasticity method, it is required that material objects be transparent, and that transmitted light be measured. Consequently, it is needed that solid portions applicable to the photoelasticity method be transparent.

As recited in Japanese Unexamined Patent Publication (KOKAI) No. 3-220,433, stresses and strains are measured by Laser Raman spectroscopic method. The method is based on Raman shift which appears when material objects are subjected to stresses and strains. This Laser Raman spectroscopic method has been applied so far only to specific material objects like silicon crystal and carbon fiber. Accordingly, it has been regarded impossible to apply this method to resin-molded products and coatings.

As summarized in "Non-Destructive Inspection Technique Series/Strain Measurement B" edited by the Japanese Society for Non-Destructive Inspection in 1980, the X-ray stress measurement is done by means of shift in X-ray diffraction peak (i.e., variation in interplanar spacing) which results from elastic deformation of crystal. In this X-ray stress measurement, the presence of crystal is indispensable. Consequently, it cannot be simply applied to amorphous material objects. For example, when measuring residual stresses at a predetermined portion in amorphous resin-molded products, fine crystalline particles, such as a metallic powder, should be mixed in resins in a large amount. As a result, the resins are impaired in terms of mechanical properties by the fine crystalline particles which are mixed therein in order to measure the residual stresses. Moreover, because of the fine crystalline particles, there arises a fear for varying the mechanical property of the resin itself, the magnitude of the residual stresses and the distribution thereof.

SUMMARY OF THE INVENTION

The present invention has been developed in view of the problems associated with the prior art. It is therefore an object of the present invention to provide a non-destructive stress detection method which cannot be adversely affected by configurations and natures of test specimens, and which hardly impairs resin-molded products in terms of mechanical properties.

A method for detecting stresses according to the present invention (hereinafter simply referred to as "the present stress detection method") can carry out the object, and it comprises the steps of:

dispersing a fluorescent substance in a solid portion where stresses are to be detected;

measuring decay time of fluorescence emitted from the fluorescent substance dispersed in the solid portion; and detecting stresses in the solid portion based on the measured decay time of fluorescence emitted from the fluorescent substance.

The inventors of the present invention discovered that the decay time of fluorescence emitted from the fluorescent substance, which is dispersed in resins, depends on the stresses which are applied to the resins, and they completed the present invention. Although it is still under investigation how the decay times are dependent on the stresses which are developed in the resins with the fluorescent substance dispersed therein, the inventors believe that the fluorescent substance itself is distorted or deformed in a certain manner by the stresses developed in the solid portion with the fluorescent substance dispersed therein, and consequently that the decay times of fluorescence emitted from the fluorescent substance are varied by the distortion or deformation.

As for the fluorescent substance employed by the present stress detection method, it is possible to use organic and inorganic fluorescent substances which have been known so far.

The present inventors carried out a variety of experiments on polythiophene which were found to work as one of the organic fluorescent substances. As a result, it was verified that the polythiophene can preferably be polythiophene which is soluble in organic solvent, and which includes at least one side chain selected from the group consisting of alkyl groups and alkoxy groups whose number of carbons fall in a range of from 1 to 12.

For instance, the polythiophene can be alkylated polythiophene which includes at least one substituent group selected from the group consisting of alkyl groups, such as a methyl group, an ethyl group, a propyl group, a butyl group, a pentyl group, a hexyl group, a heptyl group, an octyl group, a nonyl group, a decyl group, an undecyl group and a dodecyl group, at the third position and/or the fourth position in the thiophene rings. Moreover, the polythiophene can be alkoxylated polythiophene which includes at least one substituent group selected from the group consisting of alkoxy groups, such as a methoxy group, an ethoxy group, a propyoxy group, a butoxy group, a pentoxy group, a hexyloxy group, a heptoxy group, an octoxy group, a nonyloxy group, a detoxy group, an undetoxy group and a dodetoxy group, at the third position and/or the fourth position in the thiophene rings.

These alkylated polythiophenes or alkoxylated polythiophenes can be prepared by electrochemical polymerization or oxidative coupling of their monomers. They preferably have a weight-average molecular weight of from 1,000 to 100,000.

It is believed that polypyrroles which have a heterocyclic ring similar to those of the polythiophenes also work as the organic fluorescent substance. In general, however, they are likely to degrade in air, and accordingly they can be used limitedly in inert gas atmospheres.

In addition, as the organic fluorescent substance (i.e., a fluorescent label), it is possible to use a low-molecular-weight organic substance, such as trinitrofluorene, copper phthalocyanine, dibenzothiophene, fluorescamine, coumarin (1,2-benzopyrrone), naphthalene, anthracene and peryllene. Moreover, as the fluorescent label, it is further possible to use a polymer into which at least one of the low-molecular-weight organic substances is introduced as a side chain. However, the present inventors assume that these polymers can detect the variation in the stresses and strains developed in matrices (i.e., the solid portion) somewhat less effectively than the polythiophenes.

As for the inorganic fluorescent substance, it was verified that it is possible to employ zinc sulfide. Naturally, it is possible to use the other inorganic fluorescent substances.

As for material constituting the solid portion where stresses are to be detected, it is possible to exemplify thermoplastic resins and thermosetting resins. Namely, the present stress detection method can measure the stresses in molded products or coatings formed of these resins. Moreover, the present inventors believe that the present stress detection method can also measure stresses in molded products or coatings formed of inorganic substances. For example, it is possible to constitute the solid portion with water glass (i.e., sodium silicate) and the like which is solidified by evaporating its liquid content or which is reacted to solidify at relatively low temperatures.

In the step of dispersing a fluorescent substance in a solid portion where stresses are to be detected, the fluorescent substance is dispersed in matrix constituting the solid portion. It is preferred that the fluorescent substance is dispersedly held in the solid portion on the order of molecular level. However, as far as the strains in the solid portion act on the fluorescent substance or the fluorescent substance is subjected to certain strains, it is necessary for the fluorescent substance to be dispersed in the form of microparticles, not on the order of molecular level. However, the size of the dispersed particles seems to affect the magnitude of the strains applying to the fluorescent substance on which the solid portion acts. Accordingly, when detecting stresses by the present stress detection method, it is preferred that the size of the dispersed particles is substantially as large as that of the matrix constituting the solid portion.

From the view point of feasibility in the dispersing operation, it is preferable to constitute the solid portion with resin and to employ the organic fluorescent substance as the fluorescent substance. In particular, it is preferred that the resin and the fluorescent substance are miscible each other, or that they have a similar solubility parameter. As for the specific dispersing technique, it is possible to employ known mixing and dispersing techniques, such as simply kneading the fluorescent substance with the resin, dissolving the fluorescent substance in a solvent and kneading the solvent with the fluorescent substance dissolved therein into the resin, etc.

When constituting the solid portion with resin and employing the organic fluorescent substance as the fluorescent substance, it is preferred that the concentration of the mixed organic fluorescent substance falls in a range of from 0.01 to 0.5% by weight. The fluorescent substance mixed in such a concentration little affects mechanical properties of resin per se.

In the present stress detection method, it is possible to first mix the fluorescent substance with resin and thereafter mold resin-molded products. Moreover, it is possible to paint the fluorescent substance on a surface of completed resin-molded products and thereafter apply stresses to resin-molded products. Thus, in the present invention, painting is one of the forms of dispersing.

In the step of measuring fluorescence decay time of the fluorescent substance dispersed in the solid portion, the decay times can be obtained by irradiating pulsed laser light onto material objects and detecting time resolved fluorescence, which is emitted from the material objects and whose wavelength is longer than that of the laser light. Thus, stresses can be measured only in a predetermined position of the solid portion by detecting time resolved fluorescence which is emitted from the fluorescent substance dispersed in the predetermined position. Note that, in the present invention, the fluorescence decay time measurement is not particularly limited to the technique described herein.

In the step of detecting stresses in the solid portion based on the measured fluorescence decay time, a calibration curve is prepared in advance by measuring the fluorescence decay time under known stresses, and unknown stresses in the solid portion are derived from the measured decay time and the calibration curve.

Although the detecting principle of the present stress detection method, based upon the fluorescence decay time of the fluorescent substance, is still under investigation, it is believed as follows. For instance, in the present stress detecting method, the fluorescent substance is dispersed in matrix constituting the solid portion, and it is incorporated in the solid portion. Thus, the fluorescent substance is subjected to stresses similarly to the solid portion, and consequently the fluorescent substance per se is subjected to strains. In other words, the fluorescent substance can fully sense micro-stresses to which the solid portion around itself is subjected. This means that the stresses and strains to which the solid portion is subjected are deemed to be reflected in the stresses and strains to which the fluorescent substance itself is subjected. Accordingly, the fluorescence decay time of the fluorescent substance are affected by the stresses and strains applied thereto. Hence, the fluorescence decay times are considered to vary in proportion to the magnitude of the stresses and strains applied to the fluorescent substance.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

First Preferred Embodiment 3-octylthiophene monomer was polymerized electrochemically to prepare poly ( 3-octylthiophene) having a weight-average molecular weight of 48,000. 1 milligram of the poly ( 3-octylthiophene) and 2 grams of thermoplastic poly (methyl methacrylate) were dissolved into 30 milliliters of chloroform. Thereafter, the mixed solution was poured into a petri dish. The chloroform was evaporated slowly at room temperature to prepare a flat plate having a thickness of 340 micrometers.

Figure 1:
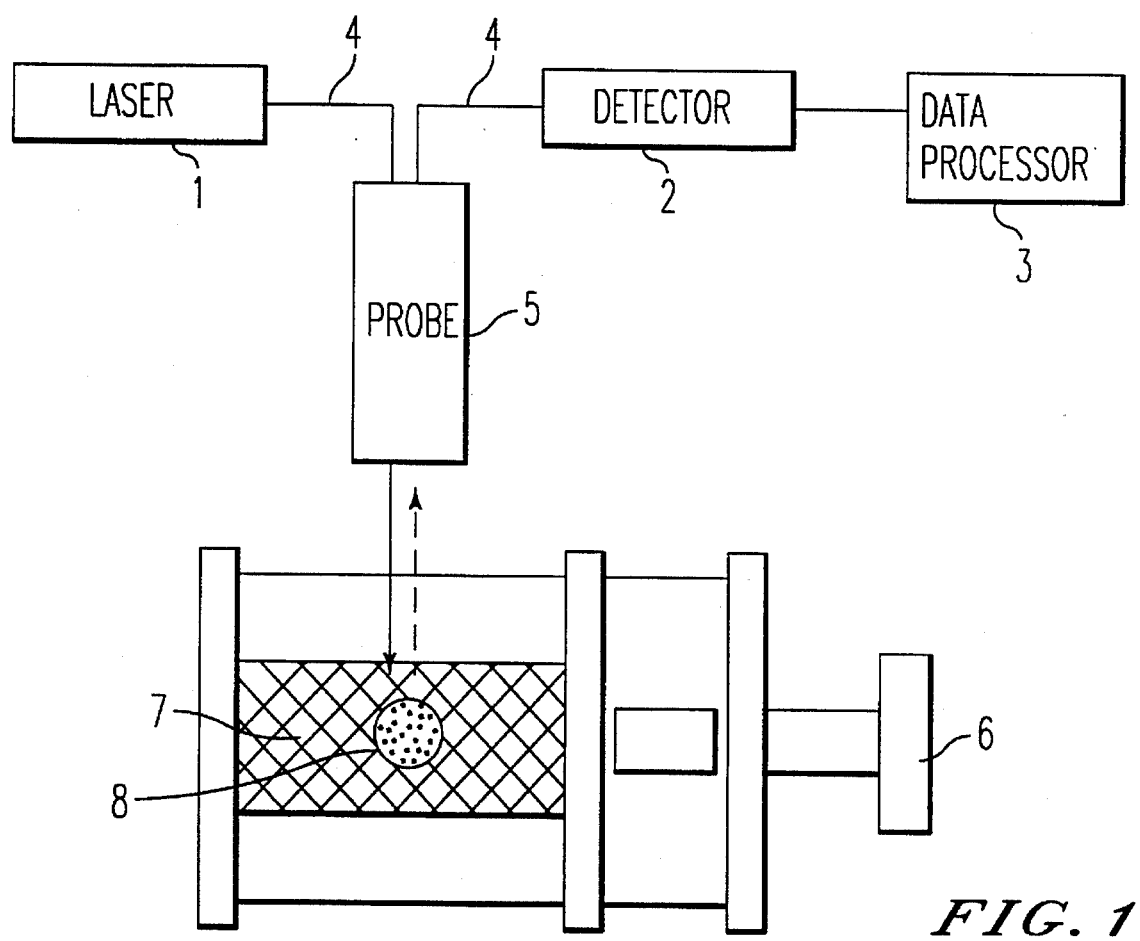
FIG. 1 is a block diagram for illustrating an outline of a fluorescence decay time measuring apparatus which was employed by First through Ninth Preferred Embodiments according to the present invention.

The resulting flat plate was installed onto a tensile jig 6 of a fluorescence decay time measuring apparatus illustrated in FIG. 1, and heated to 60° C. While keeping the temperature, the flat plate was elongated. While being subjected to the elongation (i.e., being installed onto the tensile jig 6), the flat plate was cooled down to room temperature, and subjected to a fluorescence decay time measurement at room temperature. The flat plate was elongated by 3 levels, e.g., 0%, 28% and 74%.

The fluorescence decay time measuring apparatus comprises an excitation laser 1, a detector 2, a data processor 3, a measurement probe 5, the tensile jig 6, and optical fibers 4. The detector 2, for example, includes a spectroscope and a streak camera. In this fluorescence decay time measuring apparatus, laser light having a specific wavelength was emitted from the excitation laser 1, transmitted to the measurement probe 5 by way of the left-hand-side optical fiber 4, and irradiated to a test specimen 7 (i.e., the flat plate) held to the tensile jig 6 via the measurement probe 5. Then, fluorescence 8 from the test specimen 7 was transmitted reversely to the detector 2 by way of the measurement probe 5 and the right-hand-side optical fiber 4, thereby sensing the fluorescence 8. Finally, data detected by the detector 2 was transmitted to the data processor 3, thereby calculating fluorescence decay time.

For instance, the flat plate was kept being elongated by the tensile jig 6 at the 3 levels, and irradiated by laser light of 420 nm wavelength. The flat plate emitted broad fluorescence having a wavelength of from 480 to 650 nm. Over part of the broad wavelength range, e.g., over a wavelength range of from 590 to 610 nm, poly (3-octylthiophene) was examined for its fluorescence decay time. As a result, poly (3-octylthiophene) was found to have decay times of 872 ps, 825 ps and 787 ps, respectively, when the flat plate was elongated by 0%, 28% and 74%, respectively. Namely, the larger stresses the flat plate was subjected to, the shorter fluorescence decay time poly (3-octylthiophene) exhibited.

The "fluorescent decay time" was computed as hereinafter described. For example, time resolved fluorescence, emitted after being irradiated by pulsed laser light, was first measured. Then, the measured time-resolved-fluorescence decay curve was fitted by the following exponential equation:

$$I = \Sigma A \exp\{-(t/\tau)\},$$

wherein "I" specifies intensity of fluorescence;
"A" specifies constant;
"t" specifies time; and
"τ" specifies fluorescence decay time.

Second Preferred Embodiment

Except that the same poly (3-octylthiophene) used in the First Preferred Embodiment was used in an amount of 4 milligrams, instead of 1 milligram used in the First Preferred Embodiment, the flat plate was prepared in the identical manner with the First Preferred Embodiment.

Likewise, the resulting flat plate was installed onto the tensile jig 6. While applying stresses to the flat plate, the poly (3-octylthiophene) was excited by laser light having a wavelength of 420 nm. Then, the poly (3-octylthiophene) was examined for its fluorescence decay time at room temperature over a wavelength range of from 540 to 560 nm.

As a result, the poly (3-octylthiophene) was found to have decay times of 792 ps and 741 ps, respectively, when the flat plate was elongated by 0% and 26%, respectively. Similarly, the larger stresses the flat plate was subjected to, the shorter fluorescence decay time the poly (3-octylthiophene) exhibited.

Third Preferred Embodiment 3-hexylthiophene monomer was polymerized by oxidative coupling to give poly (3-hexylthiophene) having a weight-average molecular weight of 31,000. 1 milligram of the poly (3-hexylthiophene) was mixed with 2 grams of pre-reaction solution of thermosetting melamine resin. Thereafter, the resulting mixture was poured into a petri dish made from Teflon (trade mark), and was heated to 140° C. to prepare a melamine resin flat plate having a thickness of 200 micrometers.

The resulting melamine resin flat plate was installed onto the tensile jig 6, and elongated at 80° C. in the same manner as set forth in the "First Preferred Embodiment" section. While being subjected to the elongation, the flat plate was irradiated by laser light of 420 nm wavelength. Over part of the wavelength range of the fluorescence emitted from the flat plate, e.g., over a wavelength range of from 510 to 530 nm, the poly (3-hexylthiophene) was examined for its fluorescence decay time at room temperature. As a result, the poly (3-hexylthiophene) was found to have decay times of 701 ps, 649 ps and 592 ps, respectively, when the flat plate was elongated by 0%, 3.6% and 6.5%, respectively. The larger stresses the flat plate was subjected to, the shorter fluorescence decay time the poly (3-hexylthiophene) exhibited.

Figure 2:
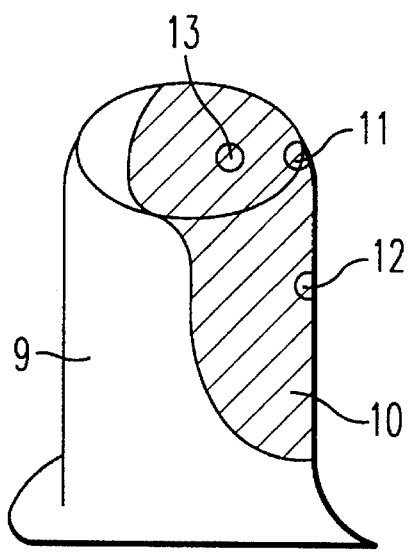
FIG. 2 schematically illustrates a beaker which was employed in a Fourth Preferred Embodiment according to the present invention and which was coated with a melamine resin including a fluorescent substance.

Fourth Preferred Embodiment 2.2 milligrams of the poly (3-octylthiophene) used in the First Preferred Embodiment was mixed with 2 grams of the pre-reaction solution of melamine resin used in the Third Preferred Embodiment. The resulting mixed solution was coated on the surface of a beaker 9 illustrated in FIG. 2. Thereafter, the beaker 9 was heated to 140° C. to prepare a melamine resin film 10.

Over an emitted-fluorescence wavelength range of from 540 to 560 nm, the poly (3-octylthiophene) was examined at room temperature for its fluorescence decay times at an edge 11, a bottom 13 and a curved side surface 12 of the beaker 9. As a result, the poly (3-octylthiophene) was found to have fluorescence decay times of 816 ps, 855 ps and 870 ps, respectively, at the edge 11, the bottom 13 and the curved side surface 12, respectively. Thus, the fluorescence decay time was reduced at the edge 11 which was subjected to larger contraction stresses resulting from curing.

Fifth Preferred Embodiment

A virgin melamine resin including the fluorescent substance used in the Third Preferred Embodiment was coated uniformly on a glass substrate, and heated to cure. Thereafter, a circle of 5 mm diameter was drawn with a sulfuric acid solution on the surface of the resulting melamine resin coated on the glass plate. Namely, the melamine resin was brought into contact with sulfuric acid to react therewith, thereby preparing a spot degradation of 5 mm diameter at the contact. Thereafter, the melamine resin was washed with water to remove the sulfuric acid completely. Then, over an emitted-fluorescence wavelength range of from 510 to 530 nm, the poly (3-hexylthiophene) was examined for its fluorescent lives at the middle and the ends of the spot degradation at room temperature. As a result, the poly (3-hexylthiophene) was found to exhibit fluorescence decay times of 727 ps and 773 ps, respectively, at the center of the spot degradation and at the ends thereof, respectively. Namely, the spot degradation was proceeded more at the center than at the ends, and accordingly subjected to relieved residual stresses at the center. In other words, the poly (3-hexylthiophene) was found to have a shorter fluorescence decay time at the center of the spot degradation than at the ends thereof.

According to the First through Fifth Preferred Embodiments described above, it is clarified that the fluorescent substance exhibits a short fluorescence decay time when it is subjected to a large stress.

Sixth Preferred Embodiment 3-methoxythiophene was polymerized by oxidative coupling to prepare poly (3-methoxythiophene) having a weight-average molecular weight of 11,000. The poly (3-methoxythiophene) was mixed uniformly with a commercially available pre-reaction solution of melamine-acrylic resin so as to prepare a mixture in which it was included in an amount of 0.41% by weight. Thereafter, the resulting mixture was heated to 140° C., thereby preparing a flat plate having a thickness of 240 micrometers.

In the same manner as described in the "First Preferred Embodiment" section, the resulting flat plate was installed onto the tensile jig 6, and elongated at 60° C. While fixing the elongations of the flat plate to predetermined values, e.g., 0%, 6.8% and 0.3%, the poly (3-methoxythiophene) was examined for its fluorescence decay time at room temperature over an emitted-fluorescence wavelength of from 500 to 520 nm. As a result, the poly (3-methoxythiophene) was found to have fluorescence decay times of 2.21 ns, 2.01 ns and 1.89 ns, respectively, when the flat plate was elongated by 0%, 6.8% and 10.3%, respectively.

Seventh Preferred Embodiment

Except that trinitrofluorene, one of the low-molecular-weight organic fluorescent substances, was mixed uniformly with a commercially available pre-reaction solution of melamine-acrylic resin so as to prepare a mixture in which it was included in an amount of 0.55% by weight, the Seventh Preferred Embodiment was carried out in a manner similar to the Sixth Preferred Embodiment, and thereby a flat plate having a thickness of 180 micrometers was prepared. The pre-reaction solution of melamine-acrylic resin employed herein was the same one as used in the Sixth Preferred Embodiment.

In the same manner as described in the "First Preferred Embodiment" section, the resulting flat plate was installed onto the tensile jig 6, and elongated at 60° C. While fixing the elongations of the flat plate to predetermined values, e.g., 0%, 7.0% and 10.7%, trinitrofluorene was examined for its fluorescence decay time at room temperature over an emitted-fluorescence wavelength range of from 590 to 610 nm. As a result, the trinitrofluorene was found to have fluorescence decay times of 3.61 ns, 4.13 ns and 4.22 ns, respectively, when the flat plate was elongated by 0%, 7.0% and 10.7%, respectively.

Contrary to the foregoing preferred embodiments, in the Seventh Preferred Embodiment, the larger stresses the flat plate was subjected to, the longer fluorescence decay time the trinitrofluorene had.

Eighth Preferred Embodiment

In the Eighth Preferred Embodiment, copper t-butylphthalocyanine, one of the low-molecular-weight organic fluorescent substances, was used. The copper t-butylphthalocyanine was mixed with a commercially available pre-reaction solution of silicone elastomer material so as to prepare a mixture in which it was included in an amount of 0.2% by weight. The resulting mixture was poured into a petri dish made from Teflon (trade mark), and was heated to 100° C. to prepare a flat plate having a thickness of 1.5 mm.

In the same manner as described in the "First Preferred Embodiment" section, the resulting flat plate was installed onto the tensile jig 6, and elongated at room temperature. While fixing the elongations of the flat plate to predetermined values, e.g., 0% and 24%, the copper t-butylphthalocyanine was examined for its fluorescence decay time at room temperature over an emitted-fluorescence wavelength range of from 480 to 530 nm. When the flat plate was elongated by 0%, the copper t-butylphthalocyanine was found to exhibit a fluorescent life of 2.23 ns. When the flat plate was elongated by 24%, the low-molecular-weight fluorescent substance was found to exhibit an extended fluorescence decay time of 2.63 ns. Thereafter, the flat plate was again put back to the starting state without the elongation (i.e., 0% elongation), and the low-molecular-weight fluorescent substance was again examined for its fluorescence decay time. As a result, the low-molecular-weight fluorescent substance was found to exhibit the inherent fluorescence decay time of 2.20 ns.

Ninth Preferred Embodiment

Except that zinc sulfide, one of the inorganic fluorescent substances, was suspended in a commercially available pre-reaction solution of silicone elastomer so as to prepare a mixture in which it was included in an amount of 0.8% by weight and then heated to 100° C., the Ninth Preferred Embodiment was carried out in a manner similar to the Eighth Preferred Embodiment, and thereby a flat plate having a thickness of 1.8 mm was prepared. The pre-reaction solution of silicone elastomer employed herein was the same one as used in the Eighth Preferred Embodiment.

In the same manner as described in the "First Preferred Embodiment" section, the resulting flat plate was installed onto the tensile jig 6, and elongated at room temperature. While keeping the elongations of the flat plate to predetermined values, e.g., 0% and 14%, the zinc sulfide was examined for its fluorescence decay time at room temperature over an emitted-fluorescence wavelength range of from 540 to 560 nm. When the flat plate was elongated by 0%, the zinc sulfide was found to have a fluorescence decay time of 2.96 ns. When the flat plate was elongated by 14%, the zinc sulfide was found to have a shortened fluorescence decay time of 2.62 ns.

Hence, the First through Ninth Preferred Embodiments described above verify that the fluorescence decay time depends on the magnitude of stresses or strains, and that the variation of the fluorescence decay time enables to estimate stresses or strains. Moreover, they also reveal that, depending on the fluorescent substances employed, the fluorescence decay time will be decreased or increased in the presence of stresses.

Tenth Preferred Embodiment

In the Tenth Preferred Embodiment, actual residual stresses in a coating was examined, and variation of residual stresses in the coating was further evaluated at 50° C. in an atmosphere of 95% relative humidity. As for the fluorescent label, poly (3-octylthiophene) was employed which was polymerized electrochemically to have a weight-average molecular weight of 48,000. As for the coatings, two commercially available coatings of acrylic copolymers cross-linked with melamine formaldehyde were used.

(Preparation of Calibration Curve)

The fluorescence label was added to each of the coatings so that its concentration was 0.02% by weight. Each of the resulting mixtures was mixed to fully dissolve the components each other, thereby preparing a coating "A" and a coating "B."

Each of the coating "A" and the coating "B" was coated on an glass plate, and heated thereafter to carry out baking at 140° C. for 30 minutes. A coating "A" and a coating "B" were thus prepared. Finally, the coating "A" and the coating "B" were peeled off from the glass plate, and cut to a rectangular shape having a length of 5 cm and a width of 2 cm. Each of the peeled coatings "A"and "B" had a thickness of about 40 micrometers.

Figure 3:
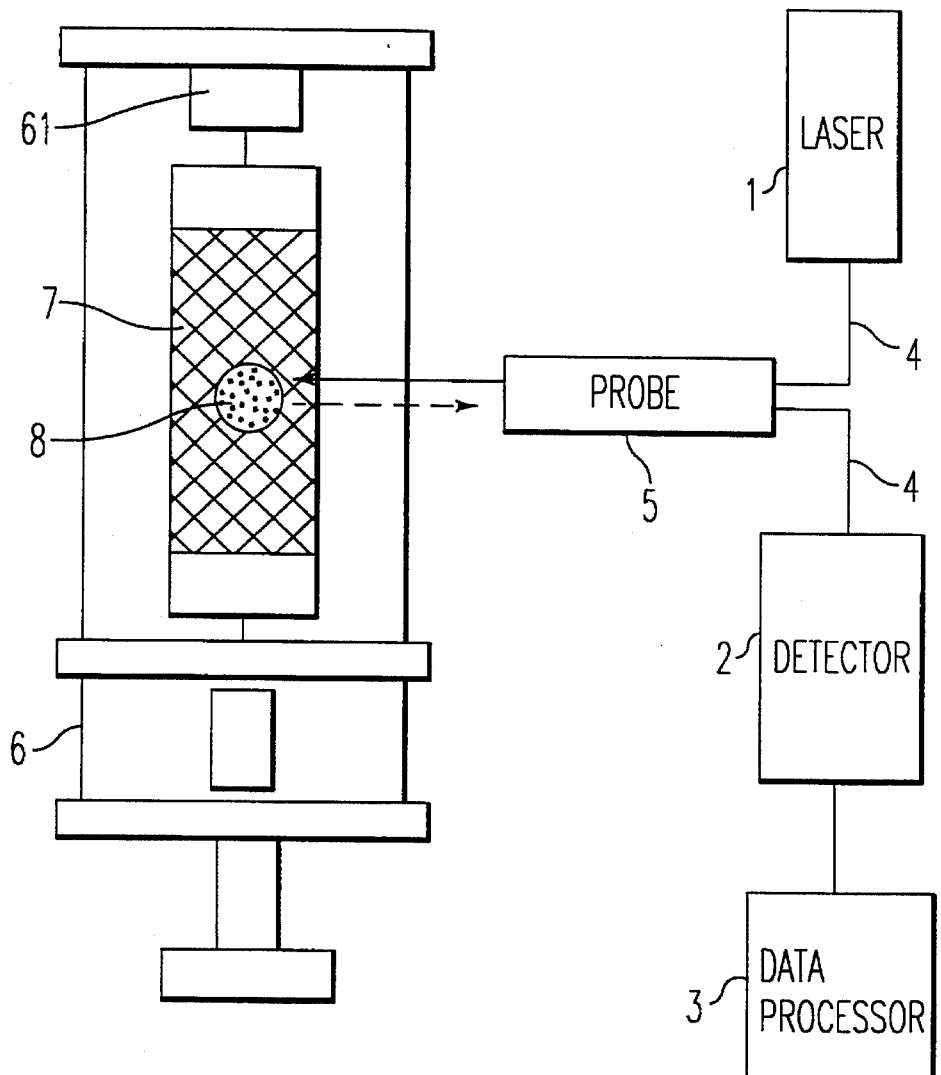
FIG. 3 is a block diagram for illustrating an outline of a fluorescence decay time measuring apparatus which was employed by a Tenth Preferred Embodiment according to the present invention.

Each of the coatings "A" and "B" was fixed at the top and bottom ends, and installed onto a tensile jig 6 of a fluorescence decay time measuring apparatus illustrated in FIG. 3. Except that this fluorescence decay time measuring apparatus included a load cell 61, it had the same arrangement as that of the fluorescence decay time measuring apparatus utilized in the First through Ninth Preferred Embodiments. The tensile jig 6 applied predetermined tensile stresses to each of the coatings "A" and "B" at room temperature, and the fluorescent label was examined for its fluorescence decay time. Specifically, laser light having a specific wavelength was emitted from the excitation laser 1, transmitted to the measurement probe 5 by way of the upper optical fiber 4, and irradiated to the test specimen 7 (i.e., coatings "A" and "B") held to the tensile jig 6 via the measurement probe 5. Then, fluorescence 8 from the test specimen 7 was transmitted reversely to the detector 2 by way of the measurement probe 5 and the lower optical fiber 4, thereby sensing the fluorescence 8. Finally, data detected by the detector 2 was transmitted to the data processor 3, thereby calculating fluorescence decay time.

Figure 5:
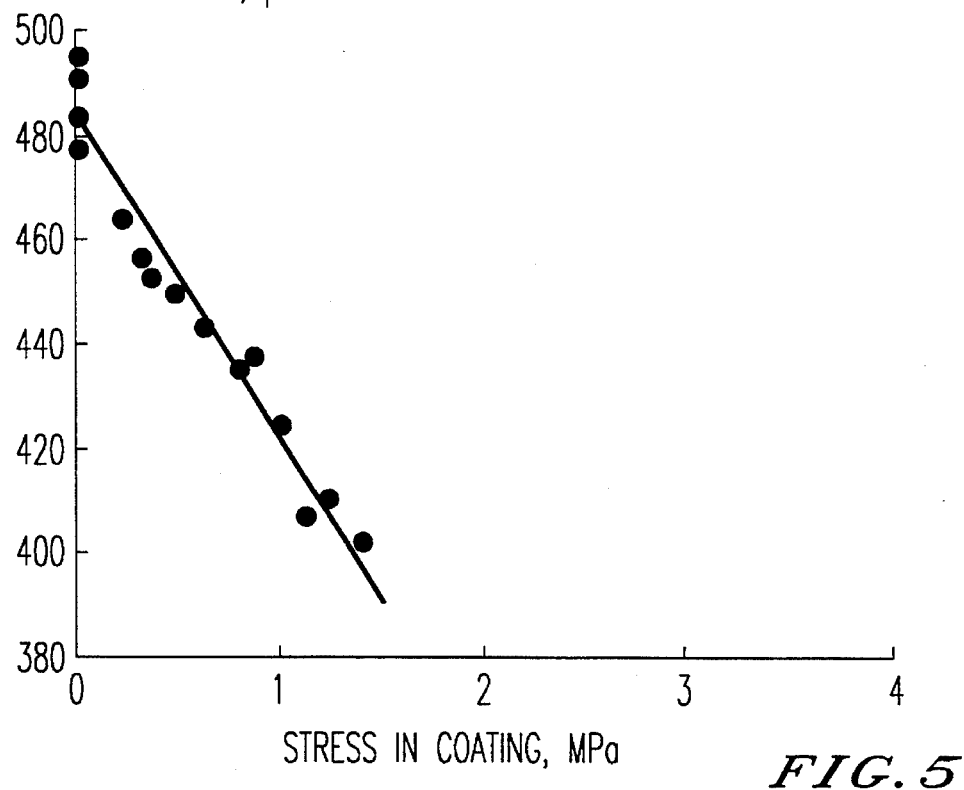
FIG. 5 is a diagram for illustrating the relationship between fluorescence decay time which was exhibited by coatings and stress for estimating a calibration curve in the Tenth Preferred Embodiment.

FIG. 5 illustrates the thus prepared calibration curve which shows a relationship between the tensile stress applied to the coating "A" and the fluorescence decay time of the fluorescent label. Note that the coating "B" also produced a calibration curve virtually same as the one illustrated in FIG. 5. According to the calibration curve illustrated in FIG. 5, the tensile stresses applied to the coatings "A" and "B," and the fluorescence decay time exhibited a linear relationship.

(Measurement of Residual Stresses in Coating)

Then, coatings were painted on metallic plates, and residual stresses in the clear-coats were measured actually.

Figure 4:
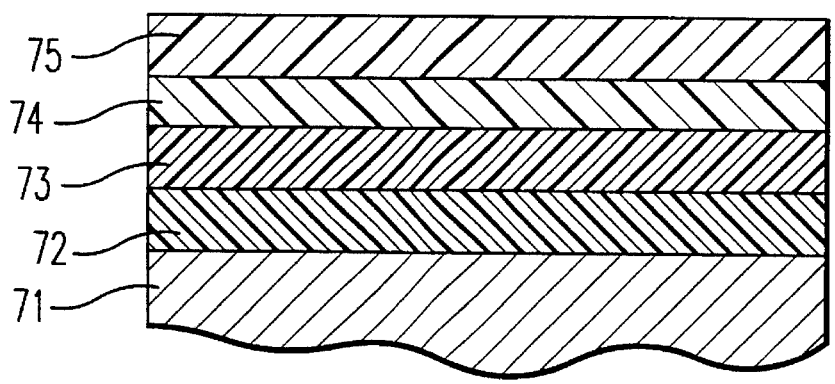
FIG. 4 is a schematic enlarged cross-sectional view of a coated steel plate which was employed by the Tenth Preferred Embodiment.

Namely, a coated steel plate was prepared as illustrated in FIG. 4. For instance, a steel plate 71 was prepared in a size of 16 cm length, 7 cm width and 1 mm thickness. An electrodeposited coat 72 was painted on the steel plate 71 by an ordinary electrodeposition coating process, and a surfacer-coat 73 was further painted on the electrodeposited coat 72 by a surfacer-coating process. Moreover, a silver metallic base coat 74 was painted on the surfacer-coat 73, and finally a clear-coat 75 was painted on the silver metallic base coat 74. The silver metallic base coat 74 and the clear-coat 75 were baked at 140° C. for 30 minutes, thereby completing the coated steel plate. Note that, when forming the clear-coat 75, the coatings "A" and "B" were used. Namely, two coated steel plates were prepared. One of the coated steel plates included the clear-coat 75 which was formed of the coating "A" and the other one of the coated steel plates included the clear-coat 75 which was formed of the coating "B."

Under the identical conditions with those for preparing the calibration curves, these two coated steel plates were examined for the fluorescence decay time of the fluorescent labels, which were present in the clear-coats 75, in order to detect residual stresses in the clear-coats 75. Thereafter, the two coated steel plates were left out in an atmosphere of high temperature and high humidity, e.g., 50° C. and 95% relative humidity. After a predetermined period of time passed, the two coated steel plates were put back in a room in order to measure fluorescence decay times of the fluorescence labels which were present in the clear-coats 75. After the fluorescence decay time measurement, the two coated steel plates were again held in the same high-temperature and high-humidity atmosphere as above, the two coated steel plates were aged further.

In accordance with the thus measured fluorescence decay times data and the calibration curves illustrated in FIG. 5, the stresses in the clear-coats 75 were evaluated. The results of the evaluation are illustrated as the relationships between the left-out times and the residual stresses in FIG. 6. When the left-out time was 0 hour (i.e., immediately after the baking), the clear-coats 75 formed of the coating "A" had a residual stress of 0.21 MPa, and the clear-coat 75 formed of the coating "B" had a residual stress of 0.50 MPa. Thus, the clear-coat 75 formed of the coating "B" exhibited a residual stress larger than the clear-coat 75 formed of the coating "A" did.

Figure 6:
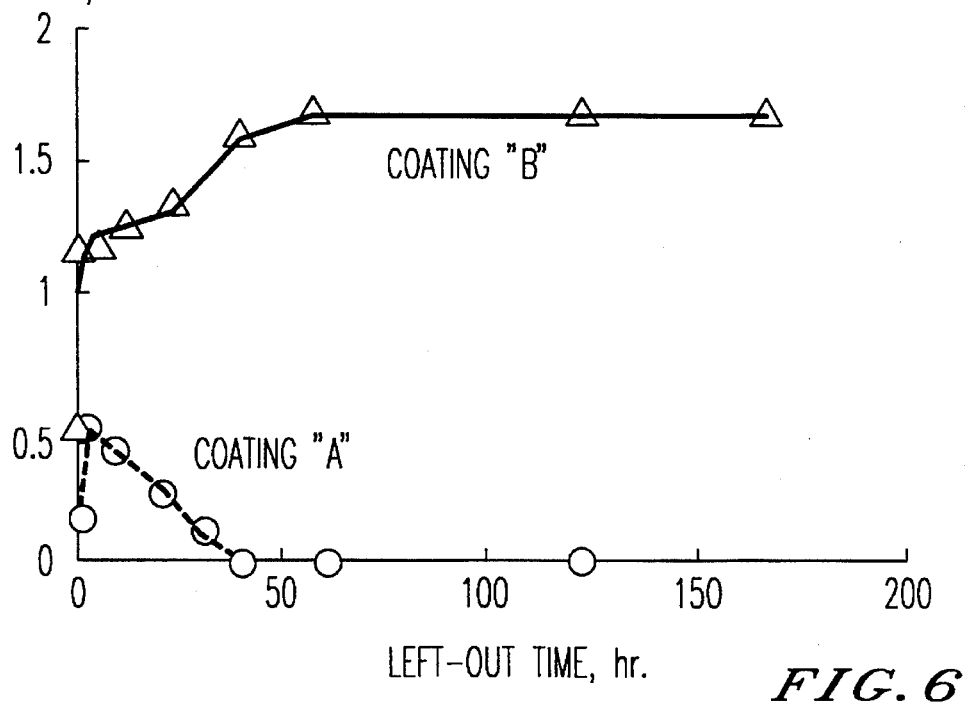
FIG. 6 is a diagram for illustrating the relationship between left-out time and residual stress which was exhibited by coated steel plates left-out under a high-temperature and high-humidity condition in the Tenth Preferred Embodiment.

As can be appreciated from FIG. 6, in the clear-coat 75 formed of the coating "A," the residual stress increased in a short period of time after it was left out in the high-temperature and high-humidity atmosphere. Then, the residual stress decreased gradually, and reached zero when it was left out in the atmosphere for about 40 hours. On the other hand, in the clear-coat 75 formed of the coating "B," the residual stress increased drastically in a short period of time after the coated steel plate was left out in the high-temperature and high-humidity atmosphere. Thus, the residual stress in the clear-coat 75 formed of the coating "B" showed tendency similar to that in the clear-coat 75 formed of the coating "A." However, the residual stress further increased gradually, and plateaued at a high level when it was left out in the atmosphere for about 60 hours.

To summarize, the Tenth Preferred Embodiment verify that, in accordance with the present invention, it is possible to measure stresses which reside in coatings painted on plates.

Having now fully described the present invention, it will be apparent to one of ordinary skill in the art that many changes and modifications can be made thereto without departing from the spirit or scope of the present invention as set forth herein including the appended claims.

What is claimed is:

1. A method for detecting stresses, comprising the steps of:
   dispersing a fluorescent substance in a solid portion of an object where stresses are to be detected;
   measuring fluorescence decay times exhibited by said dispersed fluorescent substance; and
   detecting stresses in said solid portion based on the measured fluorescence decay times.

2. The method for detecting stresses according to claim 1, wherein said solid portion is formed of a resin.

3. The method for detecting stresses according to claim 1, wherein said fluorescent substance comprises an organic fluorescent substance.

4. The method for detecting stresses according to claim 3, wherein said solid portion is formed of a resin, and said organic fluorescent substance is present in the resin in an amount of from 0.01 to 0.5% by weight with respect to a total amount of the resin and said organic fluorescent substance.

5. The method for detecting stresses according to claim 3, wherein said organic fluorescent substance is polythiophene.

6. The method for detecting stresses according to claim 5, wherein said polythiophene has a weight-average molecular weight of from 1,000 to 100,000.

7. The method for detecting stresses according to claim 5, wherein said polythiophene includes at least one side chain selected from the group consisting of alkyl groups and alkoxy groups whose number of carbons fall in a range of from 1 to 12.

8. The method for detecting stresses according to claim 7, wherein said polythiophene is alkylated polythiophene which includes at least one substituent group selected from the group consisting of a methyl group, an ethyl group, a propyl group, a butyl group, a pentyl group, a hexyl group, a heptyl group, an octyl group, a nonyl group, a decyl group, an undecyl group and a dodecyl group at one of the third position and the fourth position in its thiophene rings at least.

9. The method for detecting stresses according to claim 7, wherein said polythiophene is alkoxylated polythiophene which includes at least one substituent group selected from the group consisting of a methoxy group, an ethoxy group, a propyoxy group, a butoxy group, a pentoxy group, a hexyloxy group, a heptoxy group, an octoxy group, a nonyloxy group, a detoxy group, an undetoxy group and a dodetoxy group at one of the third position and the fourth position in its thiophene rings at least.

10. The method for detecting stresses according to claim 3, wherein said organic fluorescent substance is polypyrrole.

11. The method for detecting stresses according to claim 3, wherein said organic fluorescent substance is at least one low-molecular-weight organic substance selected from the group consisting of trinitrofluorene, copper phthalocyanine, dibenzothiophene, fluorescamine, coumarin (1,2-benzopyrrone), naphthalene, anthracene and peryllene.

12. The method for detecting stresses according to claim 3, wherein said organic fluorescent substance is a polymer having at least one low-molecular-weight organic substance selected from the group consisting of trinitrofluorene, copper phthalocyanine, dibenzothiophene, fluorescamine, coumarin (1,2-benzopyrrone), naphthalene, anthracene and peryllene as a side chain.

13. The method for detecting stresses according to claim 1, wherein said fluorescent substance comprises an inorganic fluorescent substance.

14. The method for detecting stresses according to claim 13, wherein said inorganic fluorescent substance is zinc sulfide.

15. The method for detecting stresses according to claim 1, wherein said fluorescence decay times are measured by irradiating laser light onto said solid portion and detecting time resolved fluorescence from said fluorescent substance.

* * * * *